(12) United States Patent
Prine et al.

(10) Patent No.: US 8,404,205 B2
(45) Date of Patent: Mar. 26, 2013

(54) APPARATUS AND METHOD FOR PRODUCING POLYCRYSTALLINE SILICON HAVING A REDUCED AMOUNT OF BORON COMPOUNDS BY FORMING PHOSPHORUS-BORON COMPOUNDS

(75) Inventors: Laura Prine, Theodore, AL (US); Richard M. Halstead, Spanish Fort, AL (US); Michael W. Keevan, Theodore, AL (US)

(73) Assignees: Mitsubishi Polycrystalline Silicon America Corporation (MIPSA), Theodore, AL (US); Mitsubishi Materials Corporation (MMC), Tokyo (JP)

( * ) Notice: Subject to any disclaimer, the term of this patent is extended or adjusted under 35 U.S.C. 154(b) by 0 days.

(21) Appl. No.: 12/986,794

(22) Filed: Jan. 7, 2011
(Under 37 CFR 1.47)

(65) Prior Publication Data
US 2012/0177559 A1    Jul. 12, 2012

(51) Int. Cl.
*C01B 33/03* (2006.01)
*C01B 33/035* (2006.01)

(52) U.S. Cl. .................. 423/349; 423/342; 423/348

(58) Field of Classification Search .................. 423/341, 423/342, 348–350
See application file for complete search history.

(56) References Cited

U.S. PATENT DOCUMENTS
| 4,526,769 | A  * | 7/1985 | Ingle et al. .................. 423/342 |
| 6,887,448 | B2 * | 5/2005 | Block et al. .................. 423/349 |
| 2009/0068081 | A1 * | 3/2009 | Uehara et al. ................ 423/342 |

OTHER PUBLICATIONS

Ceccaroli et al, "Solar Grade Silicon Feedstock" Handbook of Photovoltaic Science and Engineering, John Wiley & Sons, 2003, pp. 167-175.*
Hunt et al, "Handbook of Semiconductor Silicon Technology," 1990, William Andrew Publishing/Noyes, pp. 1-32.*

* cited by examiner

*Primary Examiner* — Steven Bos
*Assistant Examiner* — Justin Bova
(74) *Attorney, Agent, or Firm* — Edwards Wildman Palmer LLP

(57) ABSTRACT

The invention concerns an apparatus and a method for manufacturing polycrystalline silicon having a reduced amount of boron compounds. The invention provides an apparatus and a method which mix an unpurified trichlorosilane with purified hydrogen gas from an activated carbon tower. The mixture is sent to a distillation apparatus for purifying trichlorosilane.

2 Claims, 3 Drawing Sheets

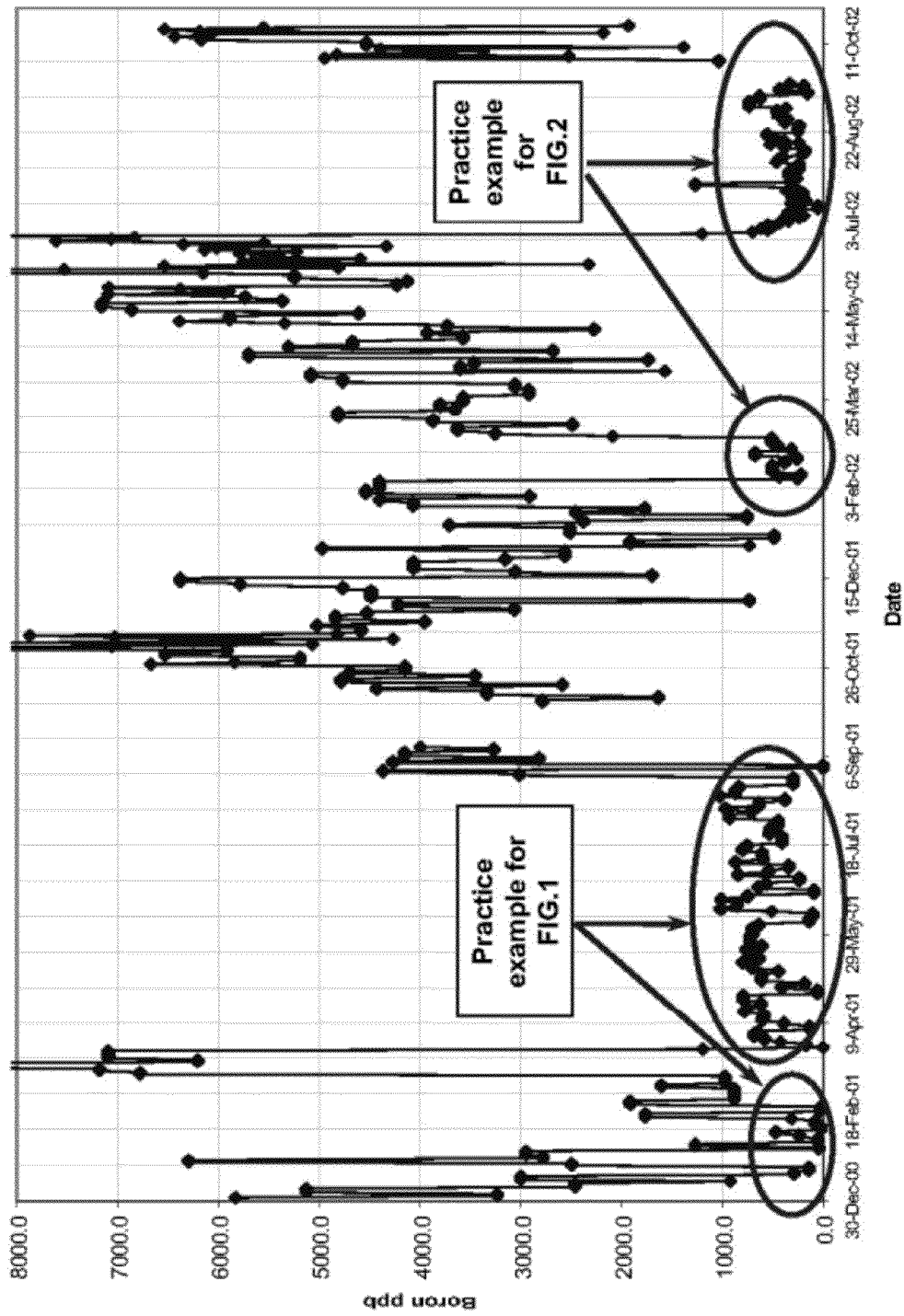

APPARATUS AND METHOD FOR PRODUCING POLYCRYSTALLINE SILICON HAVING A REDUCED AMOUNT OF BORON COMPOUNDS BY FORMING PHOSPHORUS-BORON COMPOUNDS

BACKGROUND OF THE INVENTION

1. Field of the Invention

The present invention relates to an apparatus and a method for producing polycrystalline silicon having a reduced amount of boron compounds. Especially, for reducing the amount boron compounds, an unpurified trichlorosilane is mixed with a condensate of a regeneration gas discharged from an activated carbon tower.

2. Description of Related Art

Polycrystalline silicon is produced by the reaction of trichlorosilane and hydrogen gas, in a process known as the Siemens method. In the Siemens method, high-purity polycrystalline silicon deposits on polycrystalline silicon rods by hydrogen reduction of trichlorosilane shown by formula (1) and thermal decomposition of trichlorosilane shown by formula (2):

$$SiHCl_3 + H_2 \rightarrow Si + 3HCl \quad (1)$$

$$4SiHCl_3 \rightarrow Si + 3SiCl_4 + 2H_2 \quad (2).$$

Trichlorosilane ($SiHCl_3$, abbreviated "TCS", boiling point: 31.8° C.), used as a raw material for producing high purity polycrystalline silicon, is produced by reacting metallurgical grade silicon powder (abbreviated "Me—Si") of about 98% purity, which includes boron impurities, with hydrogen chloride gas (abbreviated "HCl"). Because other reactants are also produced in the reaction, a distillation process follows the reaction of TCS and HCl.

Trichlorosilane is purified by the distilling process. However, it is very difficult to separate trichlorosilane and boron compounds, produced in the reaction, which have low boiling points like diborane ($B_2H_6$) (boiling point: −92.5° C.), boron trichloride ($BCl_3$) (boiling point: 12.4° C.), tetraborane ($B_4H_{10}$) (boiling point: 18° C.), etc., by commercial distillation processes, because the boiling point of many boron compounds are close to or lower than that of TCS. Boron is included in metallurgical grade silicon powder as an unavoidable impurity. Several different boron compounds are created in the TCS and HCl reaction.

Some methods for producing trichlorosilane are proposed for removing boron compounds, for example as disclosed in Japanese Unexamined Patent Application Publication No. 2005-67979. The application proposes a method in which an ether group is added to an unpurified chlorosilane, then the unpurified chlorosilane is distilled. However, ether group recovery followed by refining is necessary. Further, U.S. Pat. No. 4,713,230 proposes a process for purification of trichlorosilane in which the vapor phase trichlorosilane, contaminated with boron compounds, is passed through a bed of silica. But a fixed bed of silica is required to maintain the cleaning of the silica.

One object of this present invention is to provide an apparatus and a method for manufacturing polycrystalline silicon having a reduced amount of boron compounds.

SUMMARY OF THE INVENTION

This invention relates to an apparatus for producing polycrystalline silicon having a reduced amount of boron compounds, the apparatus has the following components: (A) a fluidized-bed reactor (chlorinator) for reacting metallurgical silicon with hydrogen chloride gas for producing unpurified trichlorosilane; (B) a distillation apparatus for purifying the unpurified trichlorosilane; (C) a reactor for depositing polycrystalline silicon on a surface of silicon seed rods; (D) an activated carbon tower for purifying hydrogen gas discharged from the reactor; and (E) a mixer for mixing the unpurified trichlorosilane and a condensate of regeneration gas, from the activated carbon tower wherein, a mixture made by the mixer is sent to the distillation apparatus.

This invention also relates to a method for producing polycrystalline silicon having a reduced amount of boron compounds, the method having the following steps: (A) reacting metallurgical silicon with hydrogen chloride to produce unpurified trichlorosilane; (B) distilling the unpurified trichlorosilane to purify; (C) depositing polycrystalline silicon on silicon seed rods in a reactor; (D) purifying hydrogen gas discharged from the reactor in an activated carbon tower; (E) mixing the unpurified trichlorosilane with a condensate of the regeneration gas from the activated carbon tower; and (F) feeding back the mixture to the distilling step.

The apparatus of the present invention has a fluidized-bed reactor for reacting metallurgical silicon powders having more than 98 wt% purity with hydrogen chloride. Unpurified TCS is produced by the reaction at about 280° C. (536° F.) to about 320° C. (608° F.) in the fluidized-bed reactor. This temperature range is effective for stimulating a reaction between the metallurgical silicon powders and the hydrogen chloride gas to uniformly disperse hydrogen chloride gas in the fluidized-bed reactor. The unpurified trichlorosilane including boron compounds is mixed with a condensate of regeneration gas from an activated carbon tower.

In this invention, unpurified trichlorosilane and regeneration gas are mixed each other as gas and/or liquid. For example, unpurified trichlorosilane gas is mixed with hydrogen gas in a wash tower. The trichlorosilane and the regeneration gas are cooled and condensed trichlorosilane is sprayed in the wash tower. Further, the condensed trichlorosilane is mixed with a condensate of the regeneration gas from the activated carbon tower in a static mixer. Boron compounds, which are included in the unpurified trichlorosilane, react easily with phosphorus compounds which are included in the regeneration gas in these mixers and make boron-phosphorus complex compounds which are high boiling point adduct compounds. The boron-phosphorus complex compounds are usually high boiling point products. In a downstream distillation process, these products are removed as a residue fraction. Both the gas phase and the liquid phase phosphorus compounds can be used to reduce boron concentration in raw TCS.

The mixture is fed to a distillation apparatus for purifying trichlorosilane. Each of a plurality of distillation units has a distillation tower, a condenser, a reboiler and a pump. Typically, a continuous fractional distillation is used in the distillation tower (or column). Next, in the first distilling process, a distillation temperature at a top of a first distillation column is set between about a boiling point of trichlorosilane and about a boiling point of tetrachlorosilane, so that trichlorosilane is vaporized and separated as a vapor fraction. More specifically, the temperature at the top of the first distillation column, at 96 kPa (gauge pressure), is set between about 46° C. (115° F.) and about 56° C. (133° F.). Boron compounds having a high boiling point, tetrachlorosilane ($SiCl_4$, abbreviated "STC", boiling point: 57.6° C.), polymer and a small amount of TCS as "Bottoms", are separated in the distillation process. The vapor distillates, or vapor fractions, from the process include boron compounds having a low boiling point or low boiling temperature, TCS, and a small amount of dichlorosilane (abbreviated "DCS", boiling point: 8.4° C.).

The vapor fraction is fed to a condenser and cooled at a temperature lower than the boiling point of trichlorosilane. The condensed trichlorosilane is refluxed to the distillation tower by a pump. A part of the condensed trichlorosilane is fed to another or a next distillation tower and distillation is repeated.

Residue fractions are fed from a bottom of the distillation tower to a reboiler. The residue fractions are heated and a stream of the residue fractions is fed back to the distillation tower for recycle, or is removed from the distillation tower bottom. Liquid of the residue fractions which include high boiling point boron compounds, such as pentaborane ($B_5H_9$), pentaborane ($B_5H_{11}$), diboron tetrachloride ($B_2Cl_4$), hexaborane ($B_6H_{10}$), and decaborane ($B_{10}H_{14}$), and boron-phosphorus complex compounds, are discharged from the reboiler.

The trichlorosilane is purified by above-mentioned distillation process. The purified trichlorosilane is fed to a reactor for depositing polycrystalline silicon on polycrystalline silicon seed rods.

A second embodiment relates to an apparatus for producing polycrystalline silicon having a reduced amount of boron compounds, the apparatus comprising the following components: (A) a fluidized-bed reactor for reacting metallurgical silicon with hydrogen chloride gas for producing an unpurified trichlorosilane; (B) a distillation apparatus for purifying the unpurified trichlorosilane, the distillation apparatus comprising a plurality of distillation units each of which has a condenser for separating condensed trichlorosilane from vapor fractions; (C) a reactor for depositing polycrystalline silicon on a surface of silicon seed rods; (D) an activated carbon tower for purifying hydrogen discharged from the reactor; and (E) a mixer for mixing the vapor fractions discharged from the distillation tower condensers with the regeneration gas from an activated carbon tower; and wherein, a mixture made by the mixer is sent to the distillation apparatus.

The second embodiment, further, relates to a method for producing polycrystalline silicon having a reduced amount of boron compounds, the method comprising the following steps: (A) reacting metallurgical silicon with hydrogen chloride to produce an unpurified trichlorosilane; (B) distilling the unpurified trichlorosilane to purify and, wherein the distilling has a condenser for separating trichlorosilane from vapor fractions; (C) depositing polycrystalline silicon on silicon seed rods in a reactor, (D) purifying hydrogen discharged from the reactor in an activated carbon tower; (E) mixing the vapor fractions discharged from the distillation tower condensers with the regeneration gas from the activated carbon tower; and (F) feeding back the mixture to the distilling step.

The second embodiment is mixing vapor fractions discharged from the plurality of condensers provided in the plurality of distillation units for separating trichlorosilane from the vapor fractions. This is one of the main differences with the first embodiment. The vapor fractions discharged from the condensers include more concentrated boron compounds than unpurified trichlorosilane produced by a fluidized-bed reactor. The boron compounds more effectively react with the phosphorus compounds included in the regeneration gas. Other processes or elements are same with the first embodiment.

The invention provides an apparatus and a method, which remove boron compounds from the trichlorosilane in the distillation process, and for producing polycrystalline silicon having a reduced amount of boron.

BRIEF DESCRIPTION OF THE DRAWINGS

FIG. 3 shows the amount of measured boron (ppbwt) in the initial feed line of distillation tower 4a in FIGS. 1 and 2.

DETAILED DESCRIPTION OF THE INVENTION

Figure 1:
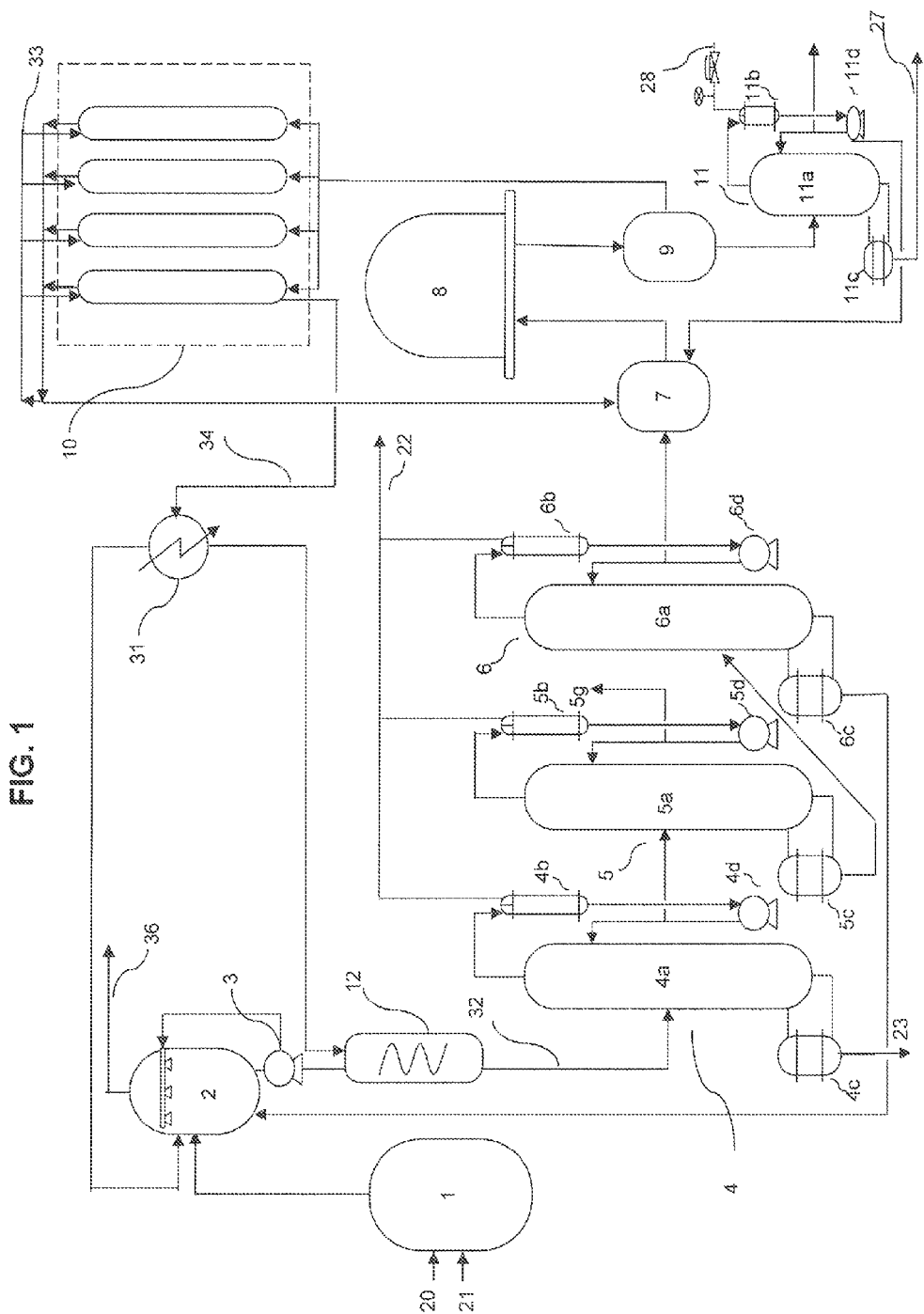
FIG. 1 is a process flow diagram illustrating one embodiment of the invention.

FIG. 1 shows a process flow diagram of the invention. This invention comprises a fluidized-bed reactor 1, a wash tower 2, a pump 3, distillation units 4-6, a vaporizer 7, a reactor 8, a condenser 9, an adsorption process 10, a distillation unit 11 for the condensate of the condenser 9, a chiller 31 and a mixer 12.

The fluidized-bed reactor 1 is for reacting metallurgical grade silicon powder (Me—Si) 20 of about 98% purity with hydrogen chloride (HCl) gas 21, based on reaction formula (3):

$$Me—Si+3HCl \rightarrow SiHCl_3+H_2 \tag{3}$$

As a result of the Me—Si and HCl reaction, a reaction gas is produced in the fluidized-bed reactor 1. The reaction gas includes TCS, STC, DCS and boron compounds. The typical yield of reactants after chlorination in the fluidized-bed reactor is approximately the following: TCS at 88 wt %, STC at 11.5 wt %, DCS at 0.5 wt % and boron at 3,000 to 6,000 ppbwt. More specifically, TCS is included at more than 80 wt %. In this embodiment, a fluidized-bed type reactor is used. The metallurgical grade silicon powder 20 is continuously fed to the fluidized-bed reactor 1. The hydrogen chloride gas 21 is fed to the fluidized-bed reactor 1 and is reacted with the metallurgical grade silicon powder 20 while the hydrogen chloride gas 21 passes through the metallurgical grade silicon powder 20. A bed temperature of the fluidized-bed reactor 1 is set between about 280° C. and about 320° C. This range of temperature is selected for producing TCS effectively.

The unpurified TCS gas is fed to a wash tower 2 for cooling and mixing with a regeneration gas. The unpurified TCS gas is cooled and is liquefied in the wash tower 2. Vent gases are discharged from wash tower 2 via a discharge line 36. The TCS liquid is refluxed by pump 3 and sprayed in the tower 2. A part of the TCS liquid is fed to a mixer 12 for mixing with a condensate of the regeneration gas. A static mixer is used as the mixer 12 in this embodiment. Boron compounds in the unpurified TCS react with phosphorus compounds in the regeneration gas and become boron-phosphorus complex compounds. Since $BCl_3$ and $B_2Cl_4$ are strong "Lewis Acids," they easily react with "Lewis Bases" such as $PH_3$ and $P_2H_4$. The example of boron-phosphorus complex compounds are $Cl_3B:PH_3$ and $Cl_4B_2:P_2H_4$, etc. and usually have a high boiling point. For an additional example, $P_2H_4$ (liquid, boiling point 51.7° C. (125° F.)), $PCl_3$ (liquid, boiling point 76.1° C. (169° F.)), and $PCl_5$ (solid, sublimination point 165° C. (329° F.)) are much higher boiling point than TCS. It is preferable to mix them over about 10 minutes prior to feeding the distillation tower 4, including tank storage time. The static mixer has a few baffles for mixing and stirring the boron compounds and the phosphorus compounds. A rotating mixer is acceptable as well.

The mixture is then fed to a distillation apparatus via a feed line 32. The boron content is this mixture fed via feed line 32 is about 200-500 ppbwt. The distillation apparatus comprises a plurality of distillation units, each of which have a distillation tower, a condenser, a pump, and a reboiler. In this embodiment, the distillation apparatus comprises three distillation units 4-6. Each distillation unit 4-6 has a distillation tower 4a-6a, a condenser 4b-6b, a pump 4d-6d, and a reboiler 4c-6c. A continuous and fractional type distillation is used as distillation tower 4a-6a. A distillation temperature at a top of the distillation tower 4a-6a is set between about the boiling point of trichlorosilane and about the boiling point of tetrachlorosilane so that trichlorosilane is vaporized and separated as a vapor fraction. More specifically, the temperature at the top of the first distillation column, at 80 kPa (gauge pressure), is set between about 45° C. (113° F.) and about 55° C. (131° F.). The temperature of the top of the distillation tower is controlled by a ratio of reflux of vapor fraction and a temperature of a reboiler.

The vapor fraction is fed to the condenser 4b-6b and TCS is condensed to liquid in the condenser 4b-6b. The condensed TCS is refluxed to the distillation tower by the pump 4d-6d. A part of the condensed TCS is fed to another or a next distillation tower and distillation is repeated. Ultimately, a purified and condensed TCS is fed to the vaporizer 7. Low boiling point compounds, excluding TCS, are discharged from the condenser 4b-6b out of the process as vent gases 22 and also are discharged as reflux cut stream 5g. These vent gases 22 include low boiling point boron compounds, such as diborone ($B_2H_6$), boron trichloride ($BCl_3$), tetraborane ($B_4H_{10}$). Column venting can be maintained by purging with an inert gas, like He, $N_2$, Ar, etc. in the distillation feed stream or the condenser feed stream.

The other hand, residue fractions are removed from a bottom of the distillation tower 4a-6a to the reboiler 4c-6c. The residue fractions are heated between about 77° C. (170° F.) to about 91° C. (195° F.) at 80 kPaG. Liquid of the residue fractions which include a high boiling point boron compounds, such as pentaborane ($B_5H_9$), pentaborane ($B_5H_{11}$), diboron tetrachloride ($B_2Cl_4$), hexaborane ($B_6H_{10}$), and decaborane ($B_{10}H_{14}$), are discharged from the reboiler 4c as bottoms 23. Boron-phosphorus complex compounds, which are produced in the wash tower 2 or the mixer 12, are discharged from the reboiler 4c as well. In the distillation process, low boiling point boron compounds such as diborane ($B_2H_6$), boron trichloride ($BCl_3$), tetraborane ($B_4H_{10}$) are also removed from the distillation tower 5a to the vent gas stream 26 and to the reflux cut stream 5g. The residue fractions from reboiler 6c are fed back to the wash tower 2. Typical purified TCS from the distillation apparatus is preferred to include no more than 0.030 ppbwt of boron compound.

In the vaporizer 7, the purified TCS and purified hydrogen gas are vaporized and are fed to the reactor 8 for producing polycrystalline silicon. A molar ratio of the purified TCS and the purified hydrogen gas is about 1:8.

A plurality of silicon seed rods (not shown) stand in the reactor 8. The plurality of silicon seed rods are heated by resistance between about 1,000° C. (1,832° F.) to about 1,200° C. (2,192° F.). High-purity polycrystalline silicon deposits on the polycrystalline silicon rods by hydrogen reduction of TCS and thermal decomposition of TCS. The mixture of unreacted TCS gas, unreacted hydrogen gas and other chlorosilanes are discharged from the reactor 8 and are fed to the condenser 9. The mixture of unreacted TCS and generated STC is condensed in the condenser 9 and is fed to distillation unit 11 for the separation of TCS and STC. The distillation unit 11 has a distillation tower 11a, a condenser 11b, a reboiler 11c and a pump 11d. Compounds remaining in a gaseous state in the condenser 11b are discharged out of the process through the vent gas line 28. Some of the condensed TCS is refluxed to the distillation tower 11a by the pump 11d and some of the separated TCS is fed back to the vaporizer 7 for recycle. Finally, some of the bottoms from reboiler 11c, particularly STC, is cut and discharged from the process via discharge line 27.

The unreacted hydrogen and other chlorosilanes stay in a gaseous state in the condenser 9 and are fed to the adsorption process 10 for purifying hydrogen gas. The adsorption process 10 has a plurality of activated carbon towers. More specifically, four activated carbon towers, which are filled with activated carbon as an adsorbent, compose the adsorption process 10. In the activated carbon tower it is acceptable to include other adsorbents, such as zeolite. A pressure swing adsorption is applied to the hydrogen adsorption process and generally comprises four steps, each of which occurring in a separate activated carbon tower. The steps are an adsorption step; a depressurization, heat, and purge step at low pressure for the regeneration of the activated carbon bed; a pressurization and a cool down step; and wait step waiting for the next adsorption step. Each activated carbon tower conducts the different steps and these steps are repeated continuously.

A part of purified hydrogen gas is fed back to the vaporizer 7 and is reused as raw material. Another part of the purified hydrogen gas is recycled in a line 33 for regeneration. Regeneration gas from the activated carbon tower bottom is fed via a line 34 to the chiller 31 for separating chlorosilate liquid and hydrogen gas. The regeneration gas is cooled below −50° C. (−58° F.). A gas fraction is fed to the wash tower 2, and a liquid fraction is fed to the mixer 12. The gas fraction includes purified hydrogen gas and phosphorus compound gasses such as $PH_3$ (gas, boiling point −87.8° C. (−126° F.)) and $PH_4Cl$ (gas, boiling point −27° C. (−16.6° F.)). The other hand, the liquid fraction includes trichlorosilane and phosphorus compound liquids such as $P_2H_4$ and $PCl_3$.

In this embodiment, boron compounds convert to boron-phosphorus complex compounds in the wash tower 2 or the mixer 12 and are removed from this polycrystalline silicon process at the distillation units 4-6.

Figure 2:
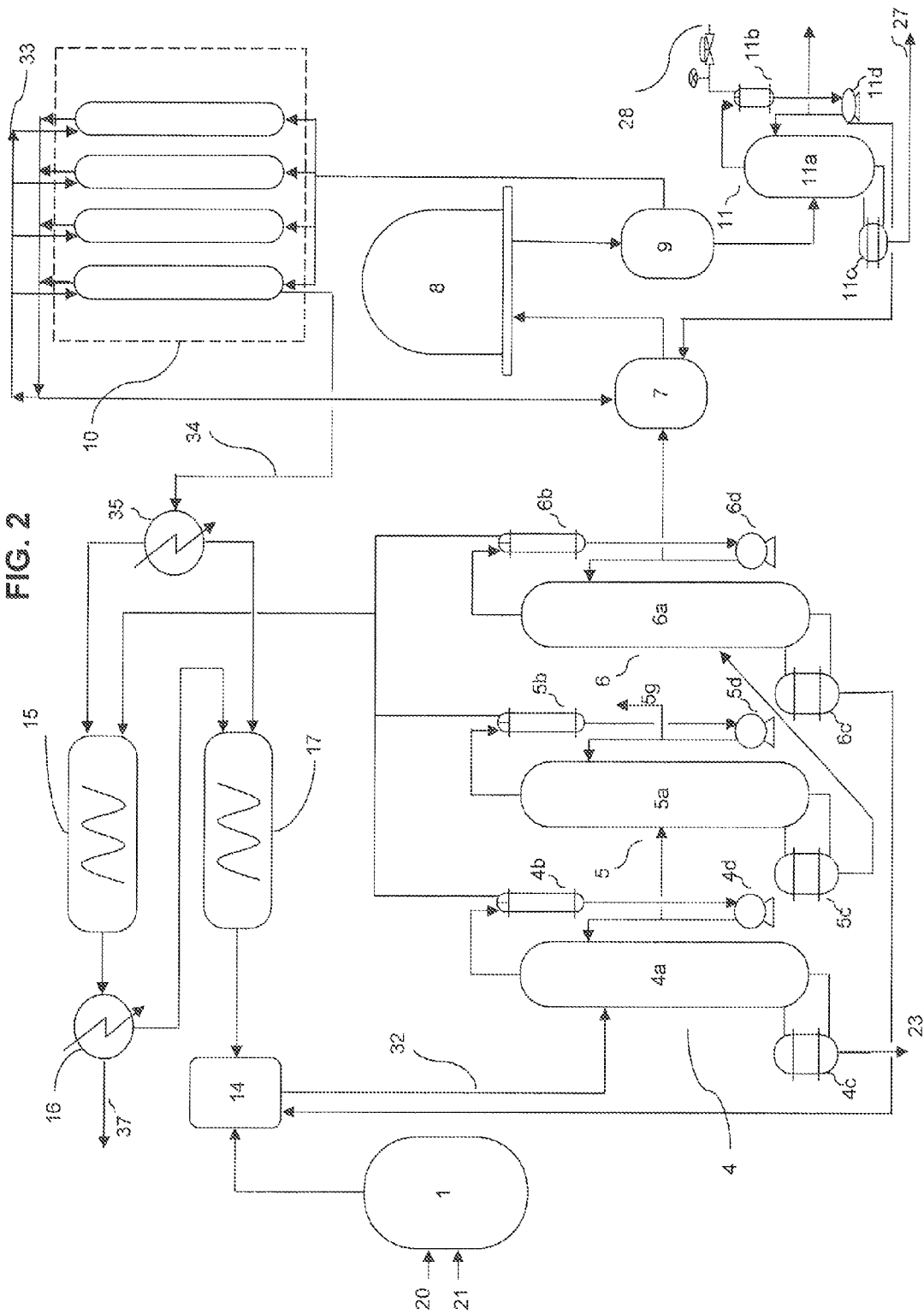
FIG. 2 is a process flow diagram illustrating a second embodiment of the invention.

FIG. 2 shows a process flow diagram of the second embodiment. This embodiment comprises similar components to the first embodiment along with new components, namely the fluidized-bed reactor 1, a TCS tank 14, the distillation units 4-6, the vaporizer 7, the reactor 8, the condenser 9, the adsorption process 10, a first chiller 35, a first mixer 15, a second chiller 16, and a second mixer 17. Especially, the TCS tank 14, the first chiller 35, the first mixer 14, the second chiller 16, and the second mixer 17 are different from the first embodiment.

In the second embodiment, the TCS tank 14 is used for collecting or stocking TCS, instead of the wash tower 2. A purpose of TCS tank 14 is to feed TCS to the distillation apparatus constantly at a flow rate between about $1.0 \times 10^{-3}$ $m^3/s$ to about $2.0 \times 10^{-3}$ $m^3/s$ in this embodiment. An atmosphere in the TCS tank is changed by inert gas, like He, $N_2$ or Ar gas, and is maintained at a uniform pressure. The unpurified TCS is fed to the distillation units 4-6. The distillation units 4-6 is the same with the first embodiment, excluding vapor fraction from the condenser 4b-6b. The vapor fraction is fed to the first mixer 15 for mixing with purified hydrogen gas in the first mixer 15. Low boiling point boron compounds in the vapor fraction are more concentrated than that of first embodiment. The regeneration gas in the adsorption process 10 is cooled in the first chiller 35 below −50° C. (−58° F.). Gas fractions from the first chiller 35 are fed to the first mixer for mixing with the vapor fraction from the condenser 4b-6b. A mixture at the first mixer 15 is fed to the second chiller 16 and cooled below −66° C. (−87° F.). Liquid fraction from the second chiller 16 is fed to the second mixer 17 for mixing with liquid fraction from the first chiller 35. Vent gases are discharged from the second chiller 16 via a discharge line 37.

Ultimately, the mixture, including trichlorosilane, at the second mixer 17 is fed to the TCS tank 14 and is reused as a raw material.

In the second embodiment, low boiling point boron compounds, which are concentrated in the distillation, react with phosphorus compounds from activated carbon towers and effectively convert to boron-phosphorus complex compounds.

FIG. 3 shows the amount of measured boron (ppbwt) in the initial feed line 32 of distillation tower 4a in FIGS. 1 and 2. FIG. 3 is a graph of data points taken of a two year period. In the embodiment in FIG. 1, measured boron is in the range of about 0 to 1,000 ppbwt with the average amount being within the range of about 500 to 1,000 ppbwt. In the embodiment in FIG. 2, measured boron is in the range of about 0 to 1,000 ppbwt with the average amount being within the range of about 0 to 500 ppbwt, as shown in FIG. 3.

The invention and embodiment are described for illustrative, but not limitative purposes. It is to be understood that changes and/or modifications can be made by those skilled in the art without for this departing from the related scope of protection, as defined by the enclosed claims.

What is claimed is:

1. A method for manufacturing polycrystalline silicon having a reduced amount of boron compounds, comprising:

reacting metallurgical silicon with hydrogen chloride to produce an unpurified trichlorosilane;

distilling the unpurified trichlorosilane, wherein the distilling has a condenser for separating trichlorosilane from vapor fractions to form purified trichlorosilane;

depositing polycrystalline silicon on silicon seed rods in a reactor by reducing and thermally decomposing the purified trichlorosilane by hydrogen reduction of trichlorosilane and thermal decomposition of trichlorosilane;

purifying hydrogen discharged from the reactor in an activated carbon tower;

mixing the vapor fractions from the condenser with a regeneration gas containing phosphorus compounds produced by the activated carbon tower, to form a mixture and combining the mixture with the unpurified trichlorosilane;

feeding a mixture of the unpurified trichlorosilane, the regeneration gas, and the vapor fractions to the step of distilling the unpurified trichlorosilane, and removing high boiling point boron-phosphorus complex compounds as a residue fraction from the distilling step and separating trichlorosilane from vapor fractions.

2. The method for manufacturing polycrystalline silicon having a reduced amount of boron compounds according to claim 1, wherein an amount of boron in an initial feed line to the step of distilling the unpurified trichlorosilane is within the range of about 0 to 500 ppbwt.

\* \* \* \* \*